United States Patent

Deussner

[15] 3,645,513

[45] Feb. 29, 1972

[54] METHOD AND DEVICE FOR THERMICALLY TREATING FINE-GRAINED MATERIALS SUSPENDED IN A HOT GAS STREAM

[72] Inventor: Herbert Deussner, Bensberg, Germany

[73] Assignee: Klockner-Humboldt-Deutz Aktiengesellschaft, Cologne-Deutz, Germany

[22] Filed: Jan. 15, 1970

[21] Appl. No.: 3,141

[30] Foreign Application Priority Data

Jan. 18, 1969 Germany ..................... P 19 02 390.6

[52] U.S. Cl. ............................... 263/21 A, 34/10, 34/57 A
[51] Int. Cl. ..................................................... F27b 15/00
[58] Field of Search ............... 263/21 R, 21 A; 34/10, 57 R, 34/57 A

[56] References Cited

UNITED STATES PATENTS

| | | | |
|---|---|---|---|
| 2,763,478 | 9/1956 | Parry | 263/21 A |
| 3,146,998 | 9/1964 | Golucke et al. | 263/21 A |
| 3,203,681 | 8/1965 | Rosa et al. | 263/21 A |

FOREIGN PATENTS OR APPLICATIONS

| | | | |
|---|---|---|---|
| 961,607 | 4/1957 | Germany | 263/21 A |
| 1,080,920 | 5/1962 | Germany | 263/21 A |

*Primary Examiner*—Charles J. Myhre
*Attorney*—Singer, Stern & Carlberg

[57] ABSTRACT

Fine-grained material, such as lime, dolomite and magnesite, is subjected to a thermic treatment in suspension in a hot gas stream and the desired product is subsequently separated in a separator. A vertically disposed treatment chamber is divided into two vertical parallel reaction zones and is connected at its lower end with a hot gas producer whose hot gases pass through the treatment zones and into separator. The material to be treated is so introduced into the treatment chamber that the coarser fraction of the material drops in one of the reaction zones into an upstream of the hot gas having a relatively low velocity while subsequently in the other reaction zone the material is caused to flow with increased velocity and then into the separator. The exhaust gas leaving the separator is conducted to a preheater, preferably a multistage cyclone heat exchanger, and the dust discharge conduit of the latter is connected with one of the two reaction zones of the treatment zone. The treated material which leaves the separator is cooled and the extracted heat is conducted to the hot gas producer as additional combustion air.

5 Claims, 1 Drawing Figure

Patented Feb. 29, 1972
3,645,513
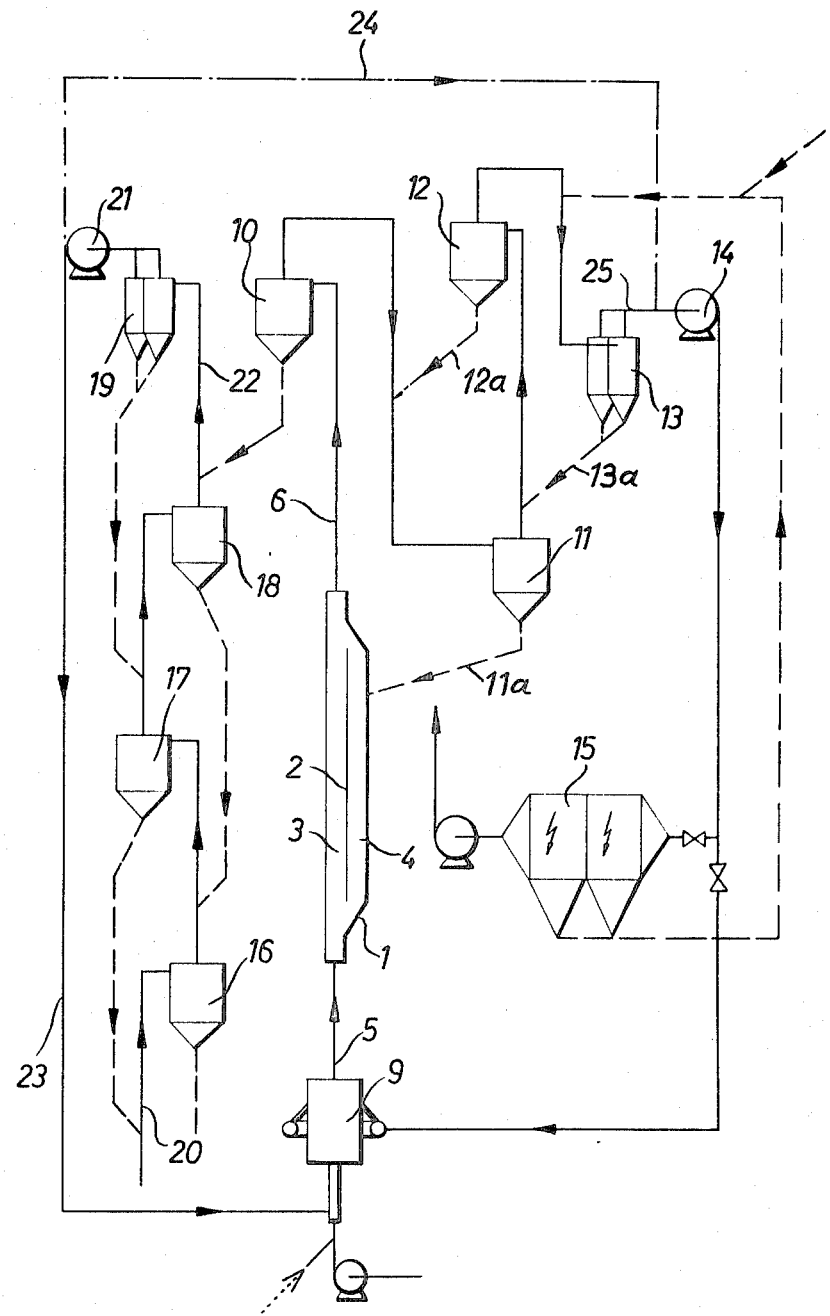
INVENTOR
Herbert Deussner
BY
Singer, Stern & Carlberg
ATTORNEYS

METHOD AND DEVICE FOR THERMICALLY TREATING FINE-GRAINED MATERIALS SUSPENDED IN A HOT GAS STREAM

The invention relates to a method for the thermic treatment of fine-grained substances, particularly lime, dolomite or magnesite in suspension in a hot gas current in a treatment chamber with subsequent separation of the treated goods in a separator.

Ordinarily for this method the raw material is comminuted before the treatment. The comminution produces a fine-grained charge comprising material particles of different grain size. This charge to be treated has a so-called grain band. The fine grain fraction of this grain band as for example, lime, dolomite or magnesite, upon oxidation is subjected to the danger of an "overburning." One individual particle of limestone may for example not be heated above maximum of about 1,200° C., as otherwise the quality of the burnt lime produced is very disadvantageously influenced. On the other hand, on account of the dissociation temperature of the carbon dioxide it is necessary, that the temperature for the dissociation lies above 800° C.

For the practical operation upon burning of fine-grained limestone, such as takes place in the known pneumatic device according to the German Pat. No. 961,607, in which fine-grained material is whirled in a hot current of gas in a tubular container for the drying of the material, it is therefore necessary, to adjust the maximum gas temperature in the reaction tube to about 1,000° C. in order not to damage the fine portion of the treated product through "overburning." The temperature differential for the dissociation temperature of the carbon dioxide is accordingly relatively low, so that in the temperature range of 1,000° to 800° C., large quantities of heating or hot gas are required, if the fine-grained material is to be heated in the shortest possible time from room temperature to the reaction temperature. When employing the disclosure made in the German Pat. No. 961,607 to the thermic treatment of fine-grained lime, dolomite or magnesite in suspension, there will appear as a disadvantage that a relatively long pipe part for the oxidation course, has to be used which must be well insulated in order not to increase the requirement for hot gas still further.

The heat capacity of the hot gases below 800° C. is not utilizable for the dissociation procedure of the carbon dioxide. Therefore there are discharged from separator, which in known manner is connected after the reaction tube for the separation, during the burning of lime, dolomite or magnesite, the treatment gases with the best possible yield for the burning operation at a temperature which lies only slightly below 800° C. When these discharged heat quantities are no longer made use of, one attains for the thermic treatment method aimed at, only a very poor degree of efficiency.

The object of the invention is a method for the burning of fine-grained material in suspension, in which the quantity ratio of fine material to hot gas is improved, particularly for the purpose of making possible the utilization of shorter reaction tubes or treatment chambers, respectively, and which insures a favorable utilization of the quantity of hot gas adapted to the method. The thermic degree of efficiency of the entire installation is hereby improved.

Accordingly the invention relates to a method for the thermic treatment of fine-grained substances, particularly of lime, dolomite or magnesite, in suspension of a gas current heated by a hot gas producer, the treatment taking place in a treatment chamber, with a subsequent separation of the treated material in a separator. In accordance with the invention, the treatment gas discharged by the separator is introduced into a preheating device for the material to be treated, preferably a one- or multiple-step cyclone heat exchange system, and the treatment gas from the preheating device is introduced entirely or partially into the hot gas producer for the formation of a gas cycle between hot gas producer, treatment chamber and preheating device.

Preferably the material taken from the separator, treated by the treatment gas is supplied to an air-operated cooling device, for example a one- or multiple-step cyclone heat exchange system. The air heated in the cooling device is supplied to the hot gas producer as combustion air.

According to a further preferred embodiment of the invention, the material to be treated is introduced into a vertically divided treatment chamber, so that the coarser grain fraction drops in one part of the treatment chamber into an updraft of the treatment gas with relatively low flow speed, and subsequently is conveyed in the other part of the treatment chamber at high flow velocity of the treatment gas to the separator.

Furthermore, it was found to be advisable, that from the current of treatment gas after flowing through an intermediary stage of the preheating device, for example, after flowing through a cyclone heat exchange stage, a regulable partial quantity is introduced into the gas cycle. Also from the end stage of the preheating device, a portion of the exhaust gas may be taken and purified in a dust-removing device, whereby the separated dust is conveyed together with the material to be treated to the preheating device. The heated cooling air discharged from the cooling device is preferably partially mixed with the treatment gases discharged by the preheating device before these gases enter into a suction-type discharge gas blower.

For practicing the described method, preferably a device is utilized, which contains in the direction of flow of the treatment gases consecutively a hot gas producer, a treatment chamber for the material to be treated and a separator, whereby for the material to be treated, a preheating device, for example, a one- or multiple-step cyclone heat exchanger is provided, and whereby a cooling device is connected for the treated material to the separator.

According to a further preferred embodiment, the treatment chamber is divided into two parallel reaction channels through which the treatment gas is caused to flow whereby the one reaction channel through which the gases flow with less speed, is provided with an aperture for the supply of the material, while the other reaction channel through which the gases flow with greater speed, after unification of the two parallel reaction channels, is in connection with a separator.

The conduit for the downdraft treatment gas the preheating device appropriately is so divided, that one arm is connected by a control valve with a device for dust removal, while another arm is attached by a further regulating valve with the hot gas producer. Behind the cooling device the conduit for the heated cooling air is suitably so divided, that one arm leads to the exhaust gas conduit of the heating device and another arm is in connection with the hot gas producer.

The preheating device has the purpose to heat the material already in front of the treatment chamber to a temperature, which lies close to the necessary reaction temperature. The determination of the length of the measuring of the treatment chamber formed by a reaction tube for burning of fine-grained lime, dolomite or magnesite, depends upon the heat required for the oxidation operation.

The advantage of preheating the combustion air of the hot gas producer by the flow out of the treated material is that the heat consumption of the installation is additionally lowered. Besides, there is attained through the gas cycle between hot gas producer and preheating device, that the required hot gas temperature may be favorably regulated upon its entry into the reaction tube through admixture of the gases conveyed back from the preheating device.

The drawing discloses by way of example an arrangement for practicing the method according to the invention.

In the flow diagram according to the drawing, is illustrated an arrangement for the burning of lime. A treatment chamber constructed as vertical shaft 1 has two reaction channels 3 and 4 and its lower end is connected by a conduit 5 with a hot gas producer 9. The upper end of the shaft 1 is connected by an exhaust gas conduit 6 with a separator, preferably a cyclone separator 10, which separates the treated material from the treatment gases (exhaust gases) and conveys the treated material to further treatment stages, for example to a cooling stage. The exhaust gases leaving the separator 10 are conveyed to a preheating device, in this case to a multistage cyclone heat exchanger. The latter consists with reference to the flow direction of the gases of cyclone separators 11, 12 and 13 connected consecutively, and through which the gases are drawn by an exhaust gas blower 14. For the purpose of obtaining a better degree of separation, the cyclone 13 is constructed as double cyclone.

The dust discharge conduit 13a of the cyclone 13 leads to the exhaust gas tube conduit between the cyclones 11 and 12, the dust discharge conduit 12a of the cyclone 12 leads to the exhaust gas conduit between the cyclones 11 and 10, and the dust discharge conduit 11a of the cyclone 11 discharges into the reaction channel 4 of the shaft 1. The cold charge and suitably the dust separated in the dust-separating device, for example, in the electrostatic dust separator 15 is introduced into the exhaust conduit between the cyclones 12 and 13. In this manner, it is possible to convey the charge in direct contact with the hot exhaust gas stage by stage against the exhaust gas current through the cyclones 13, 12 and 11 into the shaft 1 and so to make use of the still considerable heat content of the exhaust gases issuing from the cyclone 10 for the preheating of the charge up to close to the dissociation temperature. In place of the described cyclone heat exchange devices, which are adapted to the heating of fine-grained material, one may, for example, employ also a heat-exchanging device operating according to the vortex sheet principle.

Particularly favorable conditions may result if from the treatment gas current after flowing through of an intermediary stage from the preheating device 11, 12, 13, for example, cyclone heat exchange stage 12, a regulable partial quantity of the treatment gas is taken and introduced at a suitable point of the gas cycle, for example into the pipe conduit 5.

The finished burnt material separated by the cyclone separator 10 from the treatment gas current, is introduced into an air-operated cooling device comprising preferably a multiple-stage cyclone heat exchanger. The cooling heat exchanger consists here, with reference to the direction of flow of the cooling air, of consecutively connected cyclones 16, 17, 18 and 19. The cooling air is introduced by a conduit 20 into the cyclone 16 and by a cooling air blower 21 is withdrawn from the cyclone 19, which in known manner for the purpose of a better degree of separation is constructed as double cyclone.

The material separated in the separator 10 from the treatment current is first introduced into the cooling air conduit 22 between the cyclones 18 and 19 and travels then stepwise in countercurrent to the cooling air to the cyclone 16, where it is discharged for further removal. The heated cooling air withdrawn by a cool air blower is introduced by a conduit 23 into the heating or hot gas producer 9 as combustion air.

In an advantageous development of the invention, the cooling air may also be introduced by the conduit 24 shown in dot-dash lines into the suction conduit 25 of the exhaust gas blower 14. This is above all then of advantage, when the gases issuing from the preheating device still have so high a temperature that the exhaust gas blower would be endangered. By the admixture of the heated cooling air, whose temperature lies below the highest permissible temperature for the exhaust gas blower, the gas temperature may be lowered so far that the exhaust gases can be conveyed without endangering the blower.

For the prevention of the use of an excess amount of heat, it is appropriate to conduct a part of the still hot exhaust gases from the blower 14 into the hot gas producer 9, so that upon the heating of the treatment gases, appreciable quantities of fuel are saved. A further part of the exhaust gases reaches the dust separator 15 and from there it is discharged into the atmosphere.

What I claim is:

1. A method of thermal treatment of fine-grained materials, particularly lime, dolomite and magnesite, comprising the steps of
   a. passing the material in suspension in a stream of hot treatment gas from a hot gas producer through a treatment chamber,
   b. separating the treated material from said stream of hot treatment gas in a separation chamber,
   c. passing said stream of hot treatment gas through a preheater while simultaneously introducing material to be treated into said preheater,
   d. returning the stream of treatment gas to said hot gas producer by conducting it through a blower means to thus establish a treatment gas cycle through said hot gas producer, said separation chamber, and said preheater,
   e. passing the separated material from said separation chamber through a cooling device traversed by a stream of cooling air, thereby causing said cooling air to be heated,
   f. passing a portion of said heated cooling air to the intake side of said blower means thereby causing it to mix with said stream of treatment gas from said preheater, and
   g. passing the other portion of said heated cooling air to said hot gas producer to serve as preheated combustion air therein.

2. The method according to claim 1, including the steps of controllably diverting a portion of said treatment gas from said preheater, and passing said diverted portion to the hot gas producer.

3. The method according to claim 1, including the steps of passing a portion of the treatment gas leaving said preheater to a dust separator, and returning the separated dust from said dust separator to said preheater thereby causing said separated dust to enter into a mixture with said material introduced into said preheater.

4. A device for thermally treating fine-grained materials, such as lime, dolomite and magnesite, while in suspension in a hot treatment gas stream, including means forming a longitudinal vertically disposed treatment chamber, a hot gas producer connected to the lower end of said treatment chamber, a separator connected to the upper end of said treatment chamber, a preheating device for the material to be treated connected to said separator, means for conducting material to be treated from said preheating device to said treatment chamber, a cooling device for the treated material connected to the separator, a conduit which is divided at the outlet of the preheating device, one branch of said conduit for the treatment gas including a regulating valve and being connected with a dust separator while another branch of said conduit includes another regulating valve and is connected to said hot gas producer.

5. A device for thermally treating fine-grained materials, such as lime, dolomite and magnesite, while in suspension in a hot treatment gas stream, including means forming a longitudinal vertically disposed treatment chamber, a hot gas producer connected to the lower end of said treatment chamber, a separator connected to the upper end of said treatment chamber, a preheating device for the material to be treated connected to said separator, means for conducting material to be treated from said preheating device to said treatment chamber, a cooling device for the treated material connected to the separator, a conduit connected to the outlet of the cooling device, said conduit which discharges the heated cooling air being so divided that one branch leads to the exhaust gas conduit of the preheating device while the other branch is connected to the hot gas producer.

* * * * *